(12) United States Patent
Fang et al.

(10) Patent No.: US 12,139,773 B2
(45) Date of Patent: Nov. 12, 2024

(54) METHOD FOR PRODUCING ULTRA-THIN HOT-ROLLED STRIP STEEL

(71) Applicant: BAOSHAN IRON & STEEL CO., LTD., Shanghai (CN)

(72) Inventors: Yuan Fang, Shanghai (CN); Jianchun Wu, Shanghai (CN); Jian Zhang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 843 days.

(21) Appl. No.: 17/273,016

(22) PCT Filed: Sep. 12, 2019

(86) PCT No.: PCT/CN2019/105572
§ 371 (c)(1),
(2) Date: Mar. 3, 2021

(87) PCT Pub. No.: WO2020/052625
PCT Pub. Date: Mar. 19, 2020

(65) Prior Publication Data
US 2021/0317543 A1 Oct. 14, 2021

(30) Foreign Application Priority Data
Sep. 14, 2018 (CN) .......................... 201811075997.1

(51) Int. Cl.
*C21D 9/52* (2006.01)
*B21B 1/22* (2006.01)
(Continued)

(52) U.S. Cl.
CPC .................. *C21D 9/52* (2013.01); *B21B 1/22* (2013.01); *B22D 11/0622* (2013.01);
(Continued)

(58) Field of Classification Search
CPC ........ C21D 9/52; C21D 1/667; C21D 8/0205; C21D 8/0226; C21D 8/0215;
(Continued)

(56) References Cited

U.S. PATENT DOCUMENTS

| 4,168,181 A | 9/1979 | Perlus et al. |
| 2008/0216985 A1* | 9/2008 | Gunther ............... C21D 8/1222 164/474 |

FOREIGN PATENT DOCUMENTS

| CN | 1240231 A | 1/2000 |
| CN | 103374654 A | 10/2013 |

(Continued)

OTHER PUBLICATIONS

Supp. EP Search Report, dated May 19, 2021.
(Continued)

*Primary Examiner* — Anthony M Liang
*Assistant Examiner* — Danny N Kang
(74) *Attorney, Agent, or Firm* — Lei Fang, Esq.; Smith Tempel Blaha LLC

(57) ABSTRACT

A method for producing ultra-thin hot-rolled strip steel, the method comprising the following process steps: A. a smelting process: feeding scrap steel into an induction electric furnace (1) for smelting so that the scrap steel melts into molten steel; B. a refining process: using a ladle refining furnace (2) and a ladle vacuum degassing furnace (3) to refine the molten steel; C. a continuous casting process: casting the refined molten steel into a cast strip blank that has a thickness of 1.6-2.5 mm by means of a dual-roller thin strip continuous casting system (4); D. a hot rolling process: directly feeding the cast strip blank that was cast in the continuous casting process to a single-stand hot rolling mill (9) for rolling to produce hot-rolled strip steel, the thickness of the hot-rolled strip steel being 0.8-1.5 mm; E. a cooling
(Continued)

coiling process: performing atomizing cooling on the hot-rolled strip steel, and coiling after the strip steel temperature is controlled to be 400-750° C. The present method achieves an extremely compact, environmentally-friendly and economical ultra-thin hot-rolled strip steel production process flow, and achieves the environmentally-friendly and economical continuous production of metal plates and strips.

8 Claims, 1 Drawing Sheet

(51) Int. Cl.
    *B22D 11/06*     (2006.01)
    *B22D 11/116*     (2006.01)
    *B22D 11/124*     (2006.01)
    *C21D 1/667*     (2006.01)
    *C21D 8/02*     (2006.01)

(52) U.S. Cl.
    CPC ........ *B22D 11/116* (2013.01); *B22D 11/1246* (2013.01); *C21D 1/667* (2013.01); *C21D 8/0205* (2013.01); *C21D 8/0226* (2013.01); *B21B 2001/225* (2013.01)

(58) Field of Classification Search
    CPC .......... C21D 8/0263; C21D 9/46; B21B 1/22; B21B 2001/225; B21B 1/463; B21B 37/76; B22D 11/0622; B22D 11/116; B22D 11/1246; B22D 1/00; B22D 11/103; B22D 11/1206; B22D 11/124; B22D 11/14; B22D 11/144; B22D 11/18; B22D 11/20; B22D 41/13; B22D 11/12; Y02P 10/20
    See application file for complete search history.

(56) References Cited

FOREIGN PATENT DOCUMENTS

| | | | |
|---|---|---|---|
| CN | 103667878 | A | 3/2014 |
| CN | 103667895 | A * | 3/2014 |
| CN | 104975129 | A | 10/2015 |
| CN | 107142364 | A | 9/2017 |
| CN | 107186185 | A | 9/2017 |
| CN | 107201478 | A | 9/2017 |
| RU | 2092574 | C1 | 10/1997 |
| RU | 2320431 | C2 | 3/2008 |
| RU | 2351658 | C2 | 4/2009 |

OTHER PUBLICATIONS

International Search Repot mailed on Dec. 24, 2019 for PCT Patent Application No. PCT/CN2019/105572.
Written Opinion mailed on Dec. 24, 2019 for PCT Patent Application No. PCT/CN2019/105572.
RU Office Action dated Feb. 17, 2023 for RU App No. 2021109164/05.
RU Search report dated Feb. 2, 2023 for RU App No. 2021109164/05.
India OA dated Jan. 9, 2022 for App No. 202117009694.

* cited by examiner

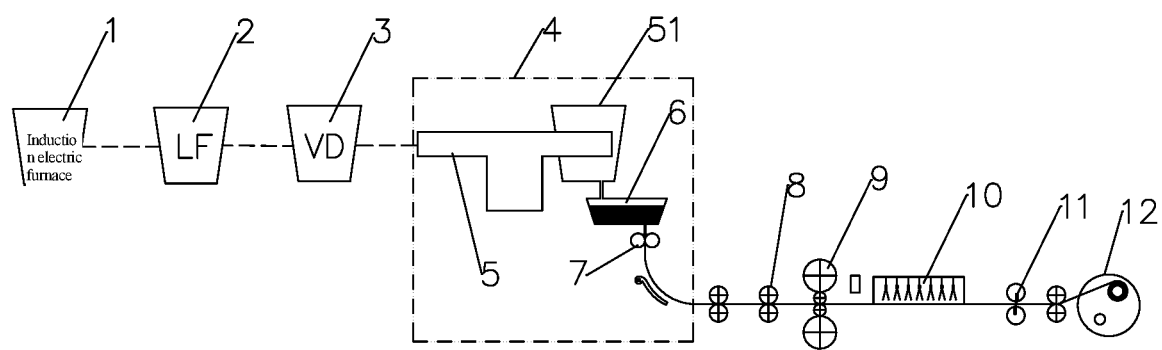

METHOD FOR PRODUCING ULTRA-THIN HOT-ROLLED STRIP STEEL

CROSS-REFERENCE TO RELATED APPLICATIONS

This application is a 371 U.S. National Phase of PCT International Application No. PCT/CN2019/105572 filed on Sep. 12, 2019, which claims benefit and priority to Chinese patent application no. CN 201811075997.1 filed on Sep. 14, 2018, the contents of both are incorporated by reference herein in their entiries.

TECHNICAL FIELD

The present disclosure relates to the technical field of hot-rolled strip steel production, in particular to a method of producing ultra-thin hot-rolled strip steel.

BACKGROUND ART

In recent years, development of ultra-thin hot-rolled strip steel has gradually become a trend. Thin hot-rolled strip steel can not only reduce the number of cold rolling passes and reduce production cost when it is used as a cold rolling raw material, but also open up new uses and new markets for hot-rolled strip steel. Some products can replace cold-rolled strip steel, and bring huge economic benefits to manufacturers and users.

In order to save investment cost and production cost, modern steel enterprises actively carry out technological innovations in existing production processes. In view of the long procedure, multiple equipments and complexity of the existing hot-rolled strip production processes, many manufacturers combine the continuous casting and rolling technology with traditional processes closely to meet the requirements of the continuous casting and rolling process. The process supplies molten steel for thin strip continuous casting mainly through an electric furnace or a converter.

The use of a converter to provide molten steel for steelmaking requires that the manufacturer should have the conditions for providing molten iron. Generally, blast furnace ironmaking or non-blast furnace ironmaking equipment is needed. This belongs to the current long-process steel production mode.

When an electric furnace is used to provide molten steel for steelmaking, scrap steel is used as the main raw material. In traditional processes such as die casting or thick slab continuous casting, the solidification cooling rate is only $10^{-1}$-$10^0$ C./s. Grain boundary segregation of the residual elements in the scrap steel occurs during the solidification process, which deteriorates the properties and quality of the steel, and even causes direct cracking and fracturing in severe cases. Therefore, in the traditional process, these harmful elements must be strictly controlled. In the selection of scrap steel raw materials, pre-screening is required, and some special treatments are required in the steelmaking process, such as addition of a concentrate for dilution, etc., which undoubtedly increase the production cost. Due to the need to control the steel composition, there are certain quality requirements for the scrap raw materials to be used. Generally, the scrap steel needs to be pre-screened and classified. In order to enhance the production efficiency, some domestic electric furnace steel plants choose to add concentrates such as purchased sponge iron, iron carbide and the like to the raw material composition to dilute the harmful elements that are difficult to be removed from the scrap steel, thereby improving the quality of the molten steel. Some domestic steel plants that have both a blast furnace and an electric furnace add self-produced molten iron into the electric furnace as a raw material in the electric furnace to improve the production efficiency of the electric furnace, thereby shortening the tapping time of the electric furnace greatly. The blending ratio of the molten iron in the electric furnace can reach 30-50%.

SUMMARY

In order to solve the above problems, the present disclosure provides a method of producing ultra-thin hot-rolled strip steel to realize a compact short-flow process in which all that is smelted is scrap steel.

In order to fulfill the above object, the method of producing ultra-thin hot-rolled strip steel according to the present disclosure comprises the following process steps: (A). smelting step: delivering scrap steel to an induction electric furnace for smelting, so that the scrap steel is melted into molten steel; (B). refining step: using a ladle refining furnace and a ladle vacuum degassing furnace to refine the molten steel; (C). continuous casting step: using a twin-roll thin strip continuous casting system to cast the refined molten steel to a cast strip blank having a thickness of 1.6-2.5 mm; (D). hot rolling step: delivering the cast strip blank that has been cast in the continuous casting step to a single-stand hot rolling mill for rolling into hot-rolled strip steel having a thickness of 0.8-1.5 mm; (E). cooling and coiling step: subjecting the hot-rolled strip steel to atomization cooling treatment to control the strip steel at a temperature 400-750° C., followed by coiling.

Preferably, in the smelting step, the scrap steel is delivered to the induction electric furnace by a charging vehicle having a preheating function, wherein a preheating temperature is 200-500° C.

Preferably, in the continuous casting step, a pouring temperature is controlled to be 30-80° C. above the liquidus.

Preferably, the twin-roll thin strip continuous casting system has a casting speed of 60-150 m/min.

Preferably, in the hot rolling step, the single-stand hot rolling mill has a total rolling reduction rate of not less than 15%.

Preferably, when the cast strip blank that has been cast in the continuous casting step is delivered to the single-stand hot rolling mill, a protective enclosure is provided around the cast strip blank, and an inert gas is fed into the protective enclosure.

Preferably, in the cooling and coiling step, when the hot-rolled strip steel is subjected to the atomization cooling treatment, the temperature of the hot-rolled strip steel is decreased at a cooling rate of 10 to 80° C./s.

Further, the atomization cooling treatment of the hot-rolled strip steel adopts three-stage cooling, wherein cooling capacities of the three-stage cooling are 50-80° C./s, 20-50° C./s and 10-20° C./s in order.

Preferably, the scrap steel is all-waste grade scrap steel.

In the method of producing ultra-thin hot-rolled strip steel according to the present disclosure, the induction electric furnace technology is utilized to realize 100% scrap steel smelting; the twin-roll thin strip continuous casting technology is utilized to realize the production of ultra-thin hot-rolled strip steel with excellent comprehensive performances from inferior scrap steel resources; the molten metal is directly cast into a thin gauge (2.5 mm thickness or less) strip blank, and the sheet material is subjected to single pass hot rolling, instead of rough rolling and hot rolling a traditional thick slab (having a thickness of 150 mm or more) to produce a hot rolled sheet, thereby obtaining a very compact short-flow process which well satisfies the requirements of low-carbon emission and short plant construction. The method of producing ultra-thin hot-rolled strip steel according to the present disclosure makes full use of the thin-strip continuous casting technology and the induction electric furnace technology. This method of producing ultra-thin hot-rolled strip steel is a compact short process that integrates smelting, continuous casting and rolling production processes. Thus, an extremely compact, environmentally friendly and economical process for producing ultra-thin hot-rolled strip steel is obtained, and the environmentally friendly and economical continuous production of metal strips is realized.

DESCRIPTION OF THE DRAWING

FIG. 1 is a schematic view showing the process equipment for the method of producing ultra-thin hot-rolled strip steel according to the present disclosure.

DETAILED DESCRIPTION

In order to make the object, technical solution and advantages according to the present disclosure clearer, the specific embodiments according to the present disclosure will be described in detail with reference to the accompanying drawing of the present disclosure. In order to keep the following description of the present disclosure clear and concise, detailed description of known technologies is omitted in the specific embodiments.

As shown by FIG. 1, the method of producing ultra-thin hot-rolled strip steel according to the present disclosure comprises the following process steps: a smelting step, a refining step, a continuous casting step, a hot rolling step, and a cooling and coiling step. The process steps will be described in detail as follows:

(A). Smelting step: scrap steel is delivered to an induction electric furnace 1 for smelting, so that the scrap steel is melted into molten steel.

The scrap steel that does not need to be sorted (all-waste grade) is loaded into a charging vehicle from a hanging basket. The charging vehicle has a preheating function. The waste gas from the refining process or natural gas can be used to preheat the scrap steel. The preheating temperature for the scrap steel is 200-500° C. The scrap steel is transported to the position of the induction electric furnace 1 while being preheated, and added to the induction electric furnace 1 for melting. The induction electric furnace 1 has a melting capacity of 35-45 tons/hour. Three induction electric furnaces may be installed, so that an hourly output is 105-135 tons of molten steel.

(B). Refining step: a ladle refining furnace 2 and a ladle vacuum degassing furnace 3 are used to refine the molten steel.

The molten steel melted in the three induction electric furnaces 1 is sequentially poured into a 100-130 ton of ladle, and the ladle is transported by a trolley to the station of the refining process for treatment. Firstly, in the ladle refining furnace (LF) 2, the composition of the molten steel is adjusted, and the temperature of the molten steel is increased. Then, in the ladle vacuum degassing furnace (VD) 3, decarburization and dehydrogenation are performed.

(C). Continuous casting step: the refined molten steel is cast through a twin-roll thin strip continuous casting system 4 to form a cast strip blank having a thickness of 1.6-2.5 mm.

The twin-roll thin strip continuous casting system 4 comprises a ladle turntable 5 for supporting a ladle 51 and rotarily transporting the molten steel, so as to ensure continuous production; a tundish 6 for transporting the molten steel and distributing the molten steel in a molten pool; and two copper alloy crystallizing rolls 7 having an internal water cooling structure for sub-rapid solidification of the molten steel.

The molten steel processed through the refining process is transported to the ladle turntable 5 of the twin-roll thin strip continuous casting system 4 by a crane. Depending on different steel grades, the pouring temperature is controlled to be 30-80° C. above the liquidus. After the ladle 51 begins pouring, the molten steel enters the tundish 6, and the molten steel is delivered through the tundish 6 to the casting molten pool formed by the two crystallizing rolls 7. The molten steel is solidified on a pair of crystallizing rolls 7 of the twin-roll thin strip continuous casting system 4, and a cast strip blank having a thickness of 1.6-2.5 mm is cast successfully. At this time, the temperature of the cast strip blank is very high, substantially above 1200° C. In order to reduce the influence of high temperature oxidation and similar factors on the strip blank, a protective enclosure (not shown in the FIGURE) is usually provided around the cast strip blank additionally. A certain amount of inert gas (such as $N_2$ or Ar) is fed into the protective enclosure to form a slightly positive pressure in the protective enclosure to achieve the gas protection effect. That is, when the cast strip blank that has been cast in the continuous casting step is delivered to the single-stand hot rolling mill 9, the protective enclosure is provided around the cast strip blank, and the cast strip blank is protected with the inert gas.

The twin-roll thin strip continuous casting system 4 has a casting speed of 60-150 m/min. The cast strip blank has a thickness of 1.6-2.5 mm, and the cast strip blank has a width of 1.0-1.6 m.

Thin strip continuous casting is a typical sub-rapid solidification process, wherein the solidification cooling rate is as high as $10^2 \sim 10^{4}$° C./s. Some harmful residual elements in scrap steel, such as Cu, Sn, P, etc., can be dissolved into the steel matrix to the greatest extent, and no grain boundary segregation occurs, so that these elements have a function of solid solution strengthening. As a result, for these harmful residual elements, the effect of "turning harm into profit" and "waste utilization" is achieved.

(D). Hot rolling step: the cast strip blank that has been cast in the continuous casting process is directly delivered to the single-stand hot rolling mill 9 for rolling to form a hot rolled strip, wherein the thickness of the hot rolled strip is 0.8-1.5 mm.

The cast strip blank protected by the atmosphere enters the single-stand hot rolling mill 9 successfully through a guiding device without a lead-out head. A single-stand four-roll hot rolling mill is used as the single-stand hot rolling mill 9, wherein it has the roll bending and roll shifting functions, or roll bending and roll crossing functions for controlling plate shape; it has the strip steel reduction function; and it has the function of guiding and correcting the strip steel. The single-stand hot rolling mill 9 is provided with a double-stand pinch roll 8 with pinching and guiding functions in front of it.

The total rolling reduction rate of the single-stand hot rolling mill 9 is not less than 15%, which is used to improve the strip blank shape and thickness, and at the same time improve the internal structure and mechanical properties.

(E). Cooling and coiling step: the hot-rolled strip steel is subjected to atomization cooling treatment, and the temperature of the strip steel is controlled at 400-750° C., followed by coiling.

An air-water atomization cooling device 10 is used for the atomization cooling treatment. By the atomization cooling of the rolled strip steel, the temperature of the strip steel is reduced to 400-750° C. at a cooling rate of 10-80° C./s, and the uniformity of the coiling temperature at the plate surface in the width and length directions is guaranteed. Preferably, the atomization cooling treatment of the hot-rolled strip steel adopts three-stage cooling, wherein cooling capacities of the three-stage cooling are 50-80° C./s, 20-50° C./s and 10-20° C./s in order. The cooling capacity here refers to the rate at which the temperature of the strip steel is lowered by cooling.

The cooled strip steel is coiled by a coiler 12. The coiler 12 may be a Carrousel coiler. A flying shear 11 is provided in front of the coiler 12 for cutting head (for the first coil) or splitting. The flying shear 11 may be a drum type flying shear with the functions of breaking, cutting head, cutting tail, and splitting. The coiler 12 comprises two cylinders to realize continuous coiling. The coiling temperature difference of each steel coil can be controlled within 10° C., and the weight of each steel coil is about 10-30 tons.

The steel coil that has been coiled by the coiler 12 is coded and bundled, and then sent to a transitional steel coil store house by a conveying mechanism for air cooling or slow cooling. So far, the ultra-thin hot-rolled strip steel has experienced the whole process of producing qualified hot-rolled strip steel from liquid metal by casting and rolling.

A comparison of the properties of the hot-rolled strip steel produced according to the present disclosure and the properties of the hot-rolled strip steel produced by other processes is shown in Table 1. In the present disclosure, the "harmful elements" in the scrap steel are utilized reasonably. They are "turned from waste into treasure". The "harmful elements" are solid-dissolved into the steel matrix, and have the function of "solid solution strengthening". Therefore, the product properties are improved significantly.

The ultra-thin hot-rolled strip steel can be used directly for further cold rolling production, surface coating, heat treatment processes, etc. The materials for the production may include carbon steel, silicon steel, stainless steel, etc. Non-ferrous metals, such as copper plate, aluminum plate, magnesium plate, etc. are also suitable.

According to the present disclosure, an induction electric furnace is used to melt scrap steel, and a ladle refining furnace (LF) and a ladle vacuum degassing furnace (VD) are used to refine the molten steel. The refined molten steel is delivered by a straddle trolley to a workshop for twin-roll thin strip continuous casting and continuous rolling. With the use of the twin-roll thin strip continuous casting system, the molten steel is directly cast into a cast strip blank having a thickness of 1.6-2.5 mm, and then the cast strip blank is rolled by a single-stand hot rolling mill. Subsequently, the rolled strip blank is subjected to reasonable atomization cooling treatment, and coiled to obtain a hot-rolled coil having a weight of 10-30 tons and a strip steel thickness of 0.8-1.5 mm. The final product has the geometric shape and internal material properties required by the existing cold-rolled strip. Therefore, an extremely compact, environmentally friendly and economical novel process flow for producing ultra-thin hot-rolled strip steel is achieved.

As described above, the exemplary specific embodiments according to the present disclosure have been described in detail with reference to the drawing. It should be understood that the present disclosure is not intended to limit the protection scope of the present disclosure to these specific details. Without departing from the spirit and scope of the present disclosure, equivalent or similar variations can be made to the structures and features of the exemplary specific embodiments, and these variations will also fall in the protection scope defined by the accompanying claims of the present disclosure.

The invention claimed is:

1. A method of producing ultra-thin hot-rolled strip steel, comprising the following process steps:

delivering 100% scrap steel to an induction electric furnace for smelting, wherein the scrap steel is melted into molten steel;

TABLE 1

| Ex. | Steel Grade Produced | Process Flow | Requirements For Scrap Steel | Yield Strength, MPa | Tensile Strength, MPa | Elongation, % |
|---|---|---|---|---|---|---|
| Ex. 1 | Q235 | Induction electric furnace + refining + thin strip continuous casting | All-waste grade, 100% scrap steel | 305 | 400 | 35% |
| Comp. Ex. 1 | Q235 | Induction electric furnace + refining + traditional continuous casting | Pre-screening, adding a concentrate to dilute harmful elements, unable to realize 100% scrap steel | 265 | 360 | 33% |
| Comp. Ex. 2 | Q235 | Converter + refining + traditional continuous casting | Using self-produced molten iron, optionally adding a small amount of pre-screened scrap steel (proportion ≤20%) | 245 | 350 | 36% | using a ladle refining furnace and a ladle vacuum degassing furnace to refine the molten steel;

casting the refined molten steel through a twin-roll thin strip continuous casting system to form a cast strip blank having a thickness of 1.6-2.5 mm;

directly delivering the cast strip blank to a single-stand hot rolling mill for rolling to form a hot rolled strip, wherein the thickness of the hot rolled strip is 0.8-1.5 mm;

Cooling and coiling the hot-rolled strip steel with an atomization cooling treatment, wherein a temperature of the hot-rolled strip steel is controlled at 400-750° C., followed by coiling.

2. The method of producing ultra-thin hot-rolled strip steel according to claim 1, wherein the scrap steel is delivered to the induction electric furnace by a charging vehicle having a preheating function, and wherein a preheating temperature is 200-500° C.

3. The method of producing ultra-thin hot-rolled strip steel according to claim 1, wherein the twin-roll thin strip continuous casting system has a casting speed of 60-150 m/min.

4. The method of producing ultra-thin hot-rolled strip steel according to claim 1, wherein the single-stand hot rolling mill has a total rolling reduction rate of not less than 15%.

5. The method of producing ultra-thin hot-rolled strip steel according to claim 1, wherein a protective enclosure is provided around the cast strip blank, and an inert gas is fed into the protective enclosure.

6. The method of producing ultra-thin hot-rolled strip steel according to claim 1, wherein the temperature of the hot-rolled strip steel is decreased at a cooling rate of 10 to 80° C./s.

7. The method of producing ultra-thin hot-rolled strip steel according to claim 1, wherein the atomization cooling treatment of the hot-rolled strip steel adopts three-stage cooling, and wherein cooling capacities of the three-stage cooling are 50-80° C./s, 20-50° C./s, and 10-20° C./s in order.

8. The method of producing ultra-thin hot-rolled strip steel according to claim 1, wherein a pouring temperature is controlled to be 30-80° C. above the liquidus in continuous casting.

* * * * *